United States Patent
Dong et al.

(10) Patent No.: US 11,117,531 B2
(45) Date of Patent: Sep. 14, 2021

(54) WIRE HARNESS MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Xueqing Dong, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 263 days.

(21) Appl. No.: 16/341,288

(22) PCT Filed: Oct. 12, 2017

(86) PCT No.: PCT/JP2017/036908
§ 371 (c)(1),
(2) Date: Apr. 11, 2019

(87) PCT Pub. No.: WO2018/079271
PCT Pub. Date: May 3, 2018

(65) Prior Publication Data
US 2021/0114533 A1    Apr. 22, 2021

(30) Foreign Application Priority Data

Oct. 31, 2016 (JP) ............................. JP2016-212667

(51) Int. Cl.
*B60R 16/02* (2006.01)

(52) U.S. Cl.
CPC ................................ *B60R 16/0215* (2013.01)

(58) Field of Classification Search
CPC .... B60R 16/0215; H02G 3/0456; H02G 3/30; B62D 25/025
(Continued)

(56) References Cited

U.S. PATENT DOCUMENTS 5,112,013 A  *  5/1992  Tolbert ................... F16L 3/137
                                                    248/74.3
6,499,702 B2    12/2002  Kamekawa et al.
(Continued)

FOREIGN PATENT DOCUMENTS

JP        06-020972         3/1994
JP        2016-086547       5/2016
(Continued)

OTHER PUBLICATIONS

Official Communication issued in International Bureau of WIPO Patent Application No. PCT/JP2017/036908, dated Nov. 14, 2017.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

Provided is a technique suitable for fixing, to a vehicle, a part of a wire harness that is maintained in a bent state, and thereafter straightening the wire harness and mounting the wire harness to a vehicle. A wire harness module includes: a wire harness including a plurality of wires; and a plurality of vehicle fixation components that are attached to the wire harness and are attachable to a vehicle. In a state in which at least one of the plurality of vehicle fixation components
(Continued)

stays fixable to the vehicle, at least one of the plurality of vehicle fixation components keeps the wire harness in a bent form.

11 Claims, 9 Drawing Sheets

(58) Field of Classification Search
USPC .......................................................... 174/72 A
See application file for complete search history.

(56) References Cited

U.S. PATENT DOCUMENTS

| | | | | |
|---|---|---|---|---|
| 9,994,169 | B2* | 6/2018 | Miyamura | ............ H01B 13/012 |
| 10,577,038 | B2* | 3/2020 | Kato | ......................... H02G 1/00 |
| 2002/0129961 | A1* | 9/2002 | Baker | ................. B60R 16/0215 |
| | | | | 174/72 A |
| 2004/0144899 | A1* | 7/2004 | Rosemann | ............... H02G 3/32 |
| | | | | 248/71 |
| 2012/0132465 | A1* | 5/2012 | Mabuchi | ............. B60R 16/0215 |
| | | | | 174/72 A |
| 2014/0151116 | A1* | 6/2014 | Doshita | ................ H02G 3/0406 |
| | | | | 174/70 R |
| 2015/0136484 | A1* | 5/2015 | Inao | ......................... H02G 3/32 |
| | | | | 174/72 A |

FOREIGN PATENT DOCUMENTS

| | | |
|---|---|---|
| WO | 2014/034899 | 3/2014 |
| WO | 2016/067877 | 5/2016 |

OTHER PUBLICATIONS

European Office Action issued in European Patent Application No. 17864865.5-1132 dated Aug. 19, 2019.

* cited by examiner

WIRE HARNESS MODULE

TECHNICAL FIELD

The present invention relates to a wire harness module that is to be incorporated into a vehicle.

BACKGROUND ART

Patent Document 1 discloses a wire harness module including: a wire harness in which a plurality of wires are bundled; a bendable exterior member externally mounted to the wire harness; and at least one vehicle fixation component that is attached to the exterior member or the wire harness and is attachable to a vehicle, wherein the at least one vehicle fixation component includes at least one bent state-holding vehicle fixation component that holds the wire harness in a bent state. In particular, Patent Document 1 discloses a configuration in which each of the first bent state-holding vehicle fixation component and the second bent state-holding vehicle fixation component includes a vehicle fixation portion that is to be fixed to the vehicle, and the first bent state-holding vehicle fixation component and the second bent state-holding vehicle fixation component are combinable by the vehicle fixation portions thereof being locked to each other.

CITATION LIST

Patent Document

Patent Document 1: JP 2016-086547A

SUMMARY OF INVENTION

Technical Problem

However, even in the case of a configuration in which the vehicle fixation portion of the first bent state-holding vehicle fixation component and the second bent state-holding vehicle fixation component are combined, if these components are combinable by the respective vehicle fixation portions thereof being locked to each other, it is necessary to fix the vehicle fixation portions after releasing the locking between the vehicle fixation portions. This complicates the operation of fixing the wire harness to the vehicle.

Therefore, it is an object of the present invention to provide a technique suitable for fixing, to a vehicle, a part of a wire harness that is maintained in a bent state, and thereafter straightening the wire harness and mounting the wire harness to a vehicle.

Solution to Problem

In order to solve the above-described problem, a wire harness module according to a first aspect is directed to a wire harness module including: a wire harness including a plurality of wires; and a plurality of vehicle fixation components that are attached to the wire harness and are attachable to a vehicle, wherein, in a state in which at least one of the plurality of vehicle fixation components stays fixable to the vehicle, at least one of the plurality of vehicle fixation components keeps the wire harness in a bent form.

A second aspect is directed to the wire harness module according to the first aspect, wherein the plurality of vehicle fixation components include a first bent state-holding vehicle fixation component and a second bent state-holding vehicle fixation component that are attached to the wire harness at separate positions, the first bent state-holding vehicle fixation component includes a first harness attachment portion that is attached to the wire harness, a first vehicle fixation portion that is fixable to the vehicle, and a first combining portion, and the second bent state-holding vehicle fixation component includes a second harness attachment portion that is attached to the wire harness, a second vehicle fixation portion that is fixable to the vehicle, and a second combining portion configured to be removably combined with (coupled to) the first combining portion.

A third aspect is directed to the wire harness module according to the first or second aspect, wherein the plurality of vehicle fixation components include, as the at least one vehicle fixation component that keeps the wire harness in a bent form, a dual-purpose vehicle fixation component including a harness attachment portion that is attached to the wire harness, and a harness holding dual-purpose vehicle fixation portion that is fixable to the vehicle and is configured to keep the wire harness in a bent form.

A fourth aspect is directed to the wire harness module according to any one of the first to third aspects, wherein at least one of the plurality of vehicle fixation components is provided with an end holding portion configured to hold an end of the wire harness.

A fifth aspect is directed to the wire harness module according to the fourth aspect, wherein the end holding portion includes an end holding component that is separable from a portion attached to the wire harness or a portion attachable to the vehicle, of the at least one of the plurality of vehicle fixation components.

Advantageous Effects of Invention

According to the first aspect, it is possible to fix, to a vehicle, one of the plurality of vehicle fixation components that stays fixable to the vehicle, and thereafter straightening the wire harness and mounting the wire harness to the vehicle.

According to the second aspect, the first combining portion and the second combining portion are provided separately from the first harness attachment portion and the first vehicle fixation portion of the first bent state-holding vehicle fixation component, and the second harness attachment portion and the second vehicle fixation portion of the second bent state-holding vehicle fixation component. Accordingly, it is possible to minimize the influence on the function of being attached to the wire harness and the function of being fixed to the vehicle.

According to the third aspect, after at least one of the plurality of vehicle fixation components is fixed to the vehicle, it is possible to release the holding of the wire harness by the harness holding dual-purpose vehicle fixation portion of the dual-purpose vehicle fixation component, and straighten the wire harness and fix the harness holding dual-purpose vehicle fixation portion to the vehicle. In addition, the harness holding dual-purpose vehicle fixation portion can be used both as a configuration for holding the harness in a bent state and a configuration for fixing the wire harness to the vehicle, thus making it possible to achieve a simplified configuration.

According to the fourth aspect, it is possible to form the wire harness module in a more compact configuration by holding an end of the wire harness on at least one of the plurality of vehicle fixation components.

According to the fifth aspect, the end holding portion can be separated after the wire harness module has been

DESCRIPTION OF EMBODIMENTS

First Embodiment

Figure 1:
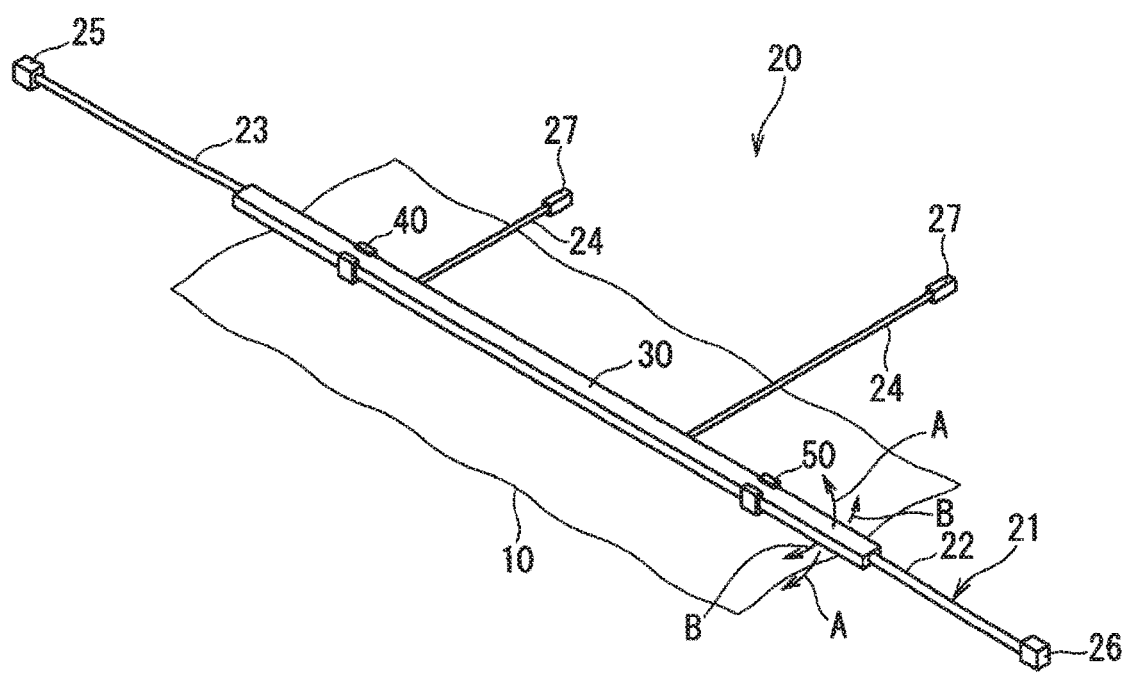
FIG. 1 is a schematic perspective view showing a configuration in which a wire harness module according to a first embodiment is disposed in a vehicle.
Figure 2:
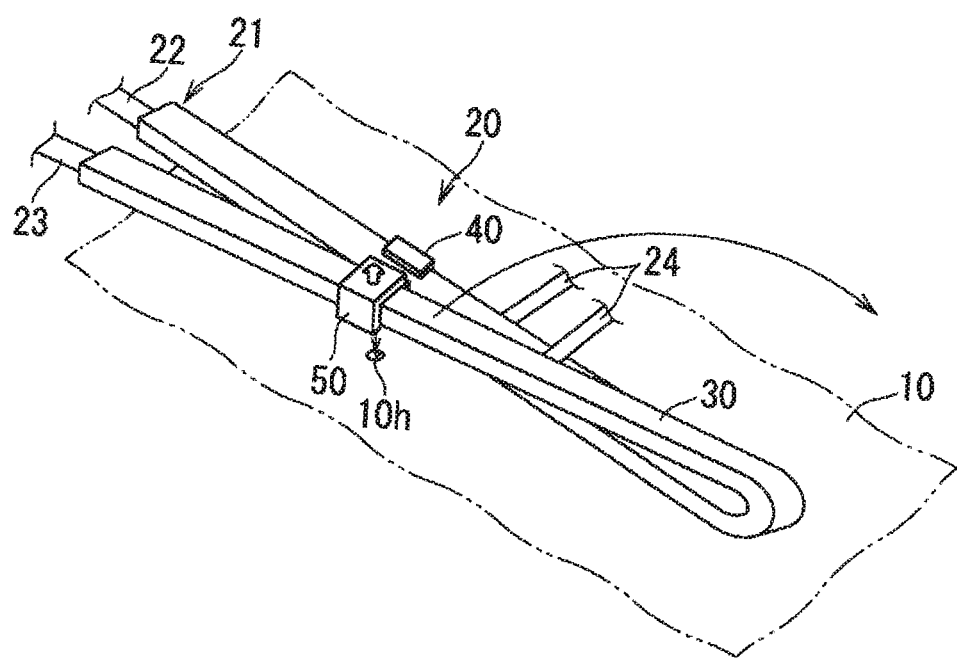
FIG. 2 is a schematic perspective view showing the wire harness module.

Hereinafter, a wire harness module according to a first embodiment will be described. FIG. 1 is a schematic perspective view showing a configuration in which a wire harness module 20 is disposed in a vehicle, and FIG. 2 is a schematic perspective view showing the wire harness module 20. The wire harness module 20 shown in FIG. 2 is shown in the initial state in which the wire harness module 20 is subjected to the operation of being disposed in a vehicle from a state in which it is folded in a transporting configuration.

The wire harness module 20 includes a wire harness 21, and a first bent state-holding vehicle fixation component 40 and a second bent state-holding vehicle fixation component 50.

The wire harness 21 includes a plurality of wires. Here, the wire harness 21 includes a wire harness body 22 formed by a plurality of wires being bundled together. Note that in the drawings, the outer shape of the plurality of bundled wires is shown. The wire harness body 22 may be branched midway in the extension direction thereof, or may be bundled in a single bundle without any such branched portion. In the example shown in FIGS. 1 and 2, the wire harness body 22 is branched at two locations midway in the extension direction. Here, the wire harness body 22 includes a main line portion 23, and branched portions 24 that are branched off midway from the main line portion 23. The wire harness body 22 may also include an optical cable or the like.

Connectors 25 and 26 are attached to ends of the wire harness body 22, i.e., opposite ends of the main line portion 23, and a connector 27 is attached to an end of each branched portion 24.

Each of the connectors 25, 26, and 27 includes one housing portion, and the connectors 25, 26, and 27 are attached to the ends of the main line portion 23 and the ends of the branched portions 24 as a result of terminals at ends of the wires being inserted and held in the cavities of the respective housing portions.

The connectors 25, 26, and 27 are connected to the respective mating connectors in a state in which the wire harness 21 of the present embodiment is mounted to a vehicle. Consequently, various electric components connected to the mating connectors are electrically connected to each other. That is, the wire harness body 22 of the present embodiment can be used as a wiring member that electrically connects various electric components of the vehicle to each other.

Note that the vehicle to which the wire harness 21 of the present embodiment is to be mounted may be a four-wheeled automobile, or may be a two-wheeled vehicle. The mounting target portion (the portion to which the harness is mounted) can be assumed to be, for example, in the form of a panel made of a metal plate or the like, or an elongated member having a rectangular tubular shape or a cylindrical shape. Here, a description will be given using an example in which the mounting target portion 10 is in the form of a panel made of a metal plate or the like, and a plurality of fixation holes 10h are formed in the mounting target portion 10 (only one fixation hole 10h is shown in FIG. 2).

A bendable exterior member 30 is externally mounted to the wire harness body 22.

Here, the exterior member 30 is a tubular member formed by extrusion molding a resin. If the exterior member 30 is formed in the shape of a tube made of a soft resin or having a thickness that allows bending, then the exterior member 30 can be made bendable. For example, the exterior member 30 may be made of a material containing, as the base resin, polyvinyl chloride (PVC), polypropylene (PP), polyethylene (PE), polyamide (PA), polyethylene terephthalate (PET), or the like.

Here, the bending direction of the exterior member 30 is restricted across the entire extension direction of the exterior member 30 such that the exterior member 30 is bent easiest in a predetermined direction from a straight state. Specifically, the exterior member 30 is formed such that the cross-sectional shape of the exterior member 30 is an elongated annular shape, here, a rectangular annular shape that is elongated in one direction, on a surface orthogonal to the extension direction of the exterior member 30. In other words, the exterior member 30 is formed in the shape of a rectangular tube. Such an exterior member 30 can be bent relatively easily in a direction in which the cross-sectional shape thereof is short (see the direction indicated by the arrow A in FIG. 1) from the straight state, whereas the exterior member 30 is more difficult to bend in a direction in which the cross-sectional shape thereof is long (see the direction indicated by the arrow B in FIG. 1) than in the former direction. Accordingly, the exterior member 30 is configured, across the entire extension direction thereof, as a bending direction restriction portion that restricts the bending direction such that the exterior member 30 is bent easiest in a predetermined direction (see the direction indicated by the arrow A in FIG. 1) from the straight state.

Note that the wire harness 21 can be disposed in the exterior member 30 by passing the wire harness 21 through the exterior member 30 from an opening of the exterior member 30 on one end, or can be disposed in the exterior member 30 by forming a slit in the exterior member 30 along the extension direction thereof and passing the wire harness 21 through the slit. In addition, openings are formed midway in the extension direction of the exterior member 30, and the branched portions 24 are drawn to the outside through the openings.

Note that, by forming the exterior member in another shape such as an elliptic cylindrical shape, the bending direction of the exterior member can also be restricted such that the exterior member is bent easiest in a predetermined direction.

However, it is not necessary that the bending direction of the exterior member is restricted such that the exterior member is bent easiest in a predetermined direction, and the exterior member may also have the shape of a cylindrical tube, a square tube, or the like. Alternatively, a corrugated tube may be used as the exterior member.

Figure 3:
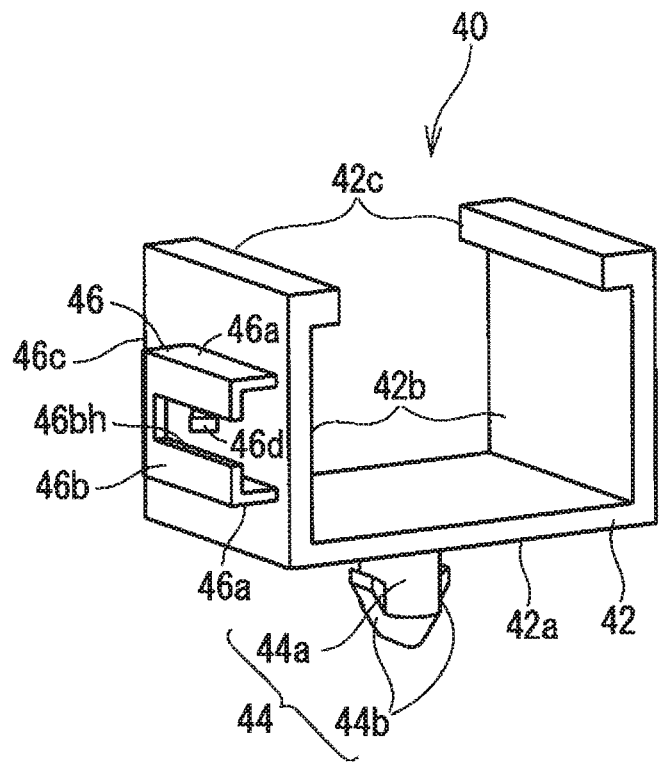
FIG. 3 is a perspective view showing a first bent state-holding vehicle fixation component.
Figure 4:
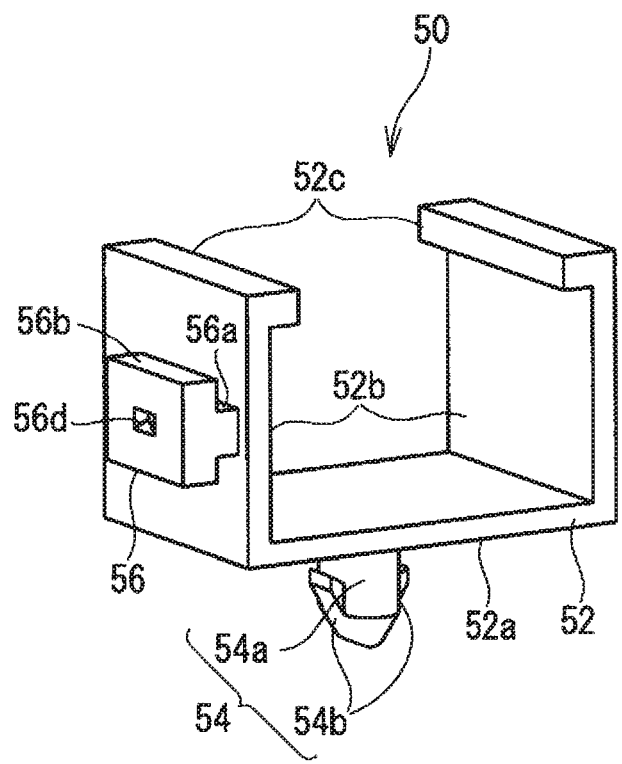
FIG. 4 is a perspective view showing a second bent state-holding vehicle fixation component.
Figure 5:
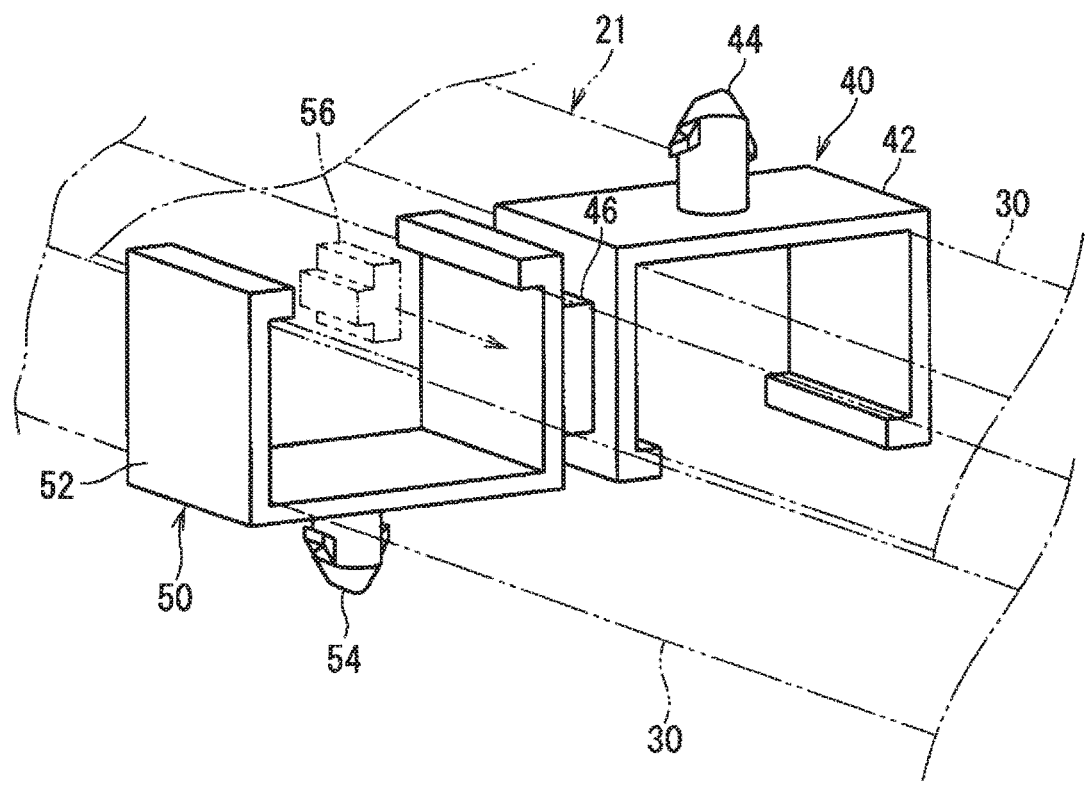
FIG. 5 is a perspective view showing a combined state of the first bent state-holding vehicle fixation component and the second bent state-holding vehicle fixation component.

FIG. 3 is a perspective view showing the first bent state-holding vehicle fixation component 40, FIG. 4 is a perspective view showing the second bent state-holding vehicle fixation component 50, and FIG. 5 is a perspective view showing a combined state of the first bent state-holding vehicle fixation component 40 and the second bent state-holding vehicle fixation component 50.

The first bent state-holding vehicle fixation component 40 and the second bent state-holding vehicle fixation component 50 are components that are attached to the wire harness body 22 at separate positions in the extension direction thereof. Here, the first bent state-holding vehicle fixation component 40 and the second bent state-holding vehicle fixation component 50 are attached to a single exterior member 30 externally mounted to the wire harness body 22, at separate positions in the extension direction thereof. An interval that is at least so large that it allows the first bent state-holding vehicle fixation component 40 and the second bent state-holding vehicle fixation component 50 to be combined by bending the exterior member 30 in the elastic deformation range thereof is provided between the first bent state-holding vehicle fixation component 40 and the second bent state-holding vehicle fixation component 50.

However, the first bent state-holding vehicle fixation component 40 and the second bent state-holding vehicle fixation component 50 may also be directly attached to the wire harness body 22. Alternatively, a plurality of exterior members may be attached to the wire harness body at separate portions, and the first bent state-holding vehicle fixation component and the second bent state-holding vehicle fixation component may be attached to different exterior members.

The first bent state-holding vehicle fixation component 40 and the second bent state-holding vehicle fixation component 50 are not only attached to the wire harness 21 but are also attachable to the mounting target portion 10 of the vehicle.

The first bent state-holding vehicle fixation component 40 is a component that has been molded as one piece using a resin or the like, and includes a first harness attachment portion 42, a first vehicle fixation portion 44, and a first combining portion 46.

The first harness attachment portion 42 is attachable to a part of the exterior member 30 in the extension direction.

Here, the first harness attachment portion 42 includes a base portion 42a and a pair of side portions 42b.

The base portion 42a is formed in the shape of an elongated plate that can be disposed on the outer surface of the exterior member 30 on the wider side across the entire width direction thereof. The pair of side portions 42b are formed in shapes standing upright from opposite sides of the base portion 42a to one principal surface side of the base portion 42a. The pair of side portions 42b are provided with a length sufficient to extend above the outer surface of the exterior member 30 on the narrower side. At a distal end of each of the pair of side portions 42b, locking pieces 42c protruding inward therefrom are formed. A space in which the exterior member 30 can be disposed is formed between the base portion 42a and the pair of side portions 42b.

Then, the inward-facing surface of the base portion 42a is brought into contact with one outer surface of the exterior member 30 on the wider side, and the inward-facing surfaces of the pair of side portions 42b are brought into contact with a pair of outer surfaces of the exterior member 30 on the narrower side, thus causing the locking pieces 42c to abut against the other outer surface of the exterior member 30 on the wider side. Consequently, the first harness attachment portion 42 is attached to the exterior member 30, and the first bent state-holding vehicle fixation component 40 as a whole is also attached to the exterior member 30.

The first harness attachment portion is formed to be attachable to an attachment target in accordance with the shape of the attachment target. For example, when the attachment target is a corrugated tube serving as an exterior member, or a wire bundle of the wire harness body 22, the first harness attachment portion may be formed as a C-shaped portion capable of surrounding a shape of a corresponding, substantially circular outer surface.

The first vehicle fixation portion 44 is fixable to the mounting target portion 10 (see FIG. 1) of the vehicle. Here, the first vehicle fixation portion 44 includes a columnar portion 44a protruding outward from the central part of the outer surface of the base portion 42a, and a pair of retaining protruding portions 44b protruding from a distal end of the columnar portion 44a. The retaining protruding portions 44b protrude expanding outward from the distal end of the columnar portion 44a toward a proximal end thereof. Then, when the first vehicle fixation portion 44 of the present embodiment is inserted into a fixation hole 10h of the mounting target portion 10, the retaining protruding portions 44b are retained at and locked to a peripheral edge of the fixation hole 10h, thus fixing the first vehicle fixation portion 44 to the mounting target portion 10 at a predetermined position. The configuration of the first vehicle fixation portion 44 is used for an attachment structure to a vehicle, as a component called a clamp, a clip or the like.

For the first vehicle fixation portion as well, a shape that can be fixed to a mounting target portion is also used in accordance with the shape of the mounting target portion. An example thereof will be described in a second embodiment, which will be discussed later.

The first combining portion 46 is configured to be removably combinable with a second combining portion 56, which will be described below.

Here, the first combining portion 46 is formed on one side surface of the first harness attachment portion 42, i.e., on the outer surface of one of the side portions 42b. The first combining portion 46 includes a pair of side portions 46a, a ceiling portion 46b, and a stopper piece portion 46c. The pair of side portions 46a are formed in the shapes of elongated plates that are provided at an interval in a direction connecting the proximal end and the distal end of the side portion 42b. The ceiling portion 46b connects the distal ends of the pair of side portions 46a. An insertion recess 46bh extending from one end to the other end of the pair of side portions 46a in the extension direction is formed in the central part of the ceiling portion 46b in the width direction. The stopper piece portion 46c connects the other ends of the pair of side portions 46a with each other. A retaining protrusion 46d whose protruding dimension gradually increases from one end toward the other end of the pair of side portions 46a in the extension direction is formed at a portion that is located on the outer surface of the side portion 42b and between the pair of side portions 46a.

The second bent state-holding vehicle fixation component 50 is a component that has been molded as one piece using a resin or the like, and includes a second harness attachment portion 52, a second vehicle fixation portion 54, and a second combining portion 56.

The second harness attachment portion 52 is attachable to a part of the exterior member 30 in the extension direction. Here, the second harness attachment portion 52 has a configuration similar to that of the first harness attachment portion 42 described above, and includes a base portion 52a and a pair of side portions 52b.

The second harness attachment portion is also formed to be attachable to an attachment target in accordance with the shape of the attachment target.

The second vehicle fixation portion 54 is fixable to the mounting target portion 10 (see FIG. 1) of the vehicle. Here, the second vehicle fixation portion 54 has a configuration similar to that of the first vehicle fixation portion 44 described above, and includes a columnar portion 54a, and a pair of retaining protruding portions 54b protruding from a distal end of the columnar portion 54a.

For the second vehicle fixation portion as well, a shape that can be fixed to a mounting target portion is also used in accordance with the shape of the mounting target portion. An example thereof will be described in the second embodiment, which will be discussed later.

The second combining portion 56 is removably combinable with the first combining portion 46.

Here, the second combining portion 56 is formed on one side surface of the second harness attachment portion 52, i.e., on the outer surface of one of the side portions 52b. The second combining portion 56 includes a base portion 56a and an insertion piece 56b. The base portion 56a is an elongated portion that is formed on the outer surface of a side portion 52b along a direction connecting opposite ends of the side portion 52b (a direction orthogonal to a direction connecting the proximal end and the distal end of the side portion 52b). The thickness of the base portion 56a is set to be the same as or smaller (slightly smaller) than the width of the insertion recess 46bh described above, and is formed to be insertable into the insertion recess 46bh. The insertion piece 56b is formed as a rectangular piece formed protruding from the distal end of the base portion 56a to opposite sides thereof. The thickness of the insertion piece 56b is set to be the same as or smaller (slightly smaller) than the gap between the side portion 42b and the ceiling portion 46b, and the width of the insertion piece 56b is set to be the same as or smaller (slightly smaller) than the interval between the pair of side portions 46a.

A retaining recess 56d into which the retaining protrusion 46d can be fitted is formed in the outward-facing surface of the insertion piece 56b. Note that the positions of the retaining protrusion 46d and the retaining recess 56d are not limited to those shown in the example, and the protrusion-recess relationship may be inversed. It is sufficient if, in a state in which the first combining portion 46 and the second combining portion 56 are combined, a protrusion is formed on one of the first combining portion 46 and the second combining portion 56, and a recess into which the protrusion can be fitted is formed on the other.

Then, the base portion 56a is inserted into the insertion recess 46bh of the first combining portion 46, and the insertion piece 56b is inserted into the space surrounded by the pair of side portions 46a and the ceiling portion 46b, thus allowing the retaining protrusion 46d to be retained in and locked to the retaining recess 56d. Consequently, the first combining portion 46 and the second combining portion 56 are brought into a combined state. When a force is applied from this state to the first combining portion 46 in a direction in which the second combining portion 56 is pulled out, the retention of the retaining protrusion 46d and the retaining protrusion 46d is released by elastic deformation of at least a part of the first combining portion 46 and the second combining portion 56. Consequently, the combined state between the first combining portion 46 and the second combining portion 56 can be released, thus making it possible to remove the second combining portion 56 from the first combining portion 46.

With this wire harness module 20, in a bent form during e.g. transport or the initial period of mounting, at least one of the first vehicle fixation portion 44 and the second vehicle fixation portion 54 maintains the wire harness 21 in a bent form in a state in which at least one of the first vehicle fixation portion 44 and the second vehicle fixation portion 54 serving as the plurality of vehicle fixation components stays fixable to the vehicle. Here, the first combining portion 46 of the first bent state-holding vehicle fixation component 40 and the second combining portion 56 of the second bent state-holding vehicle fixation component 50 maintain the wire harness 21 in a bent form, and, therefore, the first vehicle fixation portion 44 and the second vehicle fixation portion 54 are maintained in a state in which they can be fixed to the mounting target portion 10 of the vehicle, while being exposed to the outside.

Accordingly, as shown in FIG. 2, for example, while keeping the state in which the first combining portion 46 and the second combining portion 56 are combined, the first vehicle fixation portion 44 of the first bent state-holding vehicle fixation component 40 can be fixed, for example, by being inserted into one fixation hole 10h of the mounting target portion 10, thereafter the second combining portion 56 can be removed from the first combining portion 46 to straighten the wire harness 21, and the second vehicle fixation portion 54 of the second bent state-holding vehicle fixation component 50 can be fixed, for example, by being inserted into one fixation hole 10h of the mounting target portion 10.

Accordingly, the operation of mounting the wire harness 21 to the vehicle can be easily performed. For example, let us assume an operation in which the wire harness module 20 is mounted to a vehicle by using a robot apparatus or the like. A part of a combined structure of the first bent state-holding vehicle fixation component 40 and the second bent state-holding vehicle fixation component 50 can be grabbed with a robot hand, for example, and fixed to the vehicle. Thereafter, the combined state of the first bent state-holding vehicle fixation component 40 and the second bent state-holding vehicle fixation component 50 can be subsequently released using the robot hand, and the second bent state-holding vehicle fixation component 50 can be fixed to the vehicle. These operations can be easily performed as a series of operations.

Since the first combining portion 46 and the second combining portion 56 are provided separately from the first harness attachment portion 42 and the first vehicle fixation portion 44 of the first bent state-holding vehicle fixation component 40, and the second harness attachment portion 52 and the second vehicle fixation portion 54 of the second bent state-holding vehicle fixation component 50, it is possible to provide the first combining portion 46 and the second combining portion 56 with emphasis on the function of maintaining the wire harness 21 in a bent form, while minimizing the influence on the function of attaching the components to the wire harness 21 and the function of fixing the components to the vehicle.

Modifications

Based on the first embodiment described above, various modifications will be described.

First, in the case of externally mounting an exterior member to the wire harness body 22, an exterior member including a path restricting portion that performs path restriction for the wire harness, and an easily bendable portion that is more easily bendable than the path restricting portion may be used as the exterior member.

Figure 6:
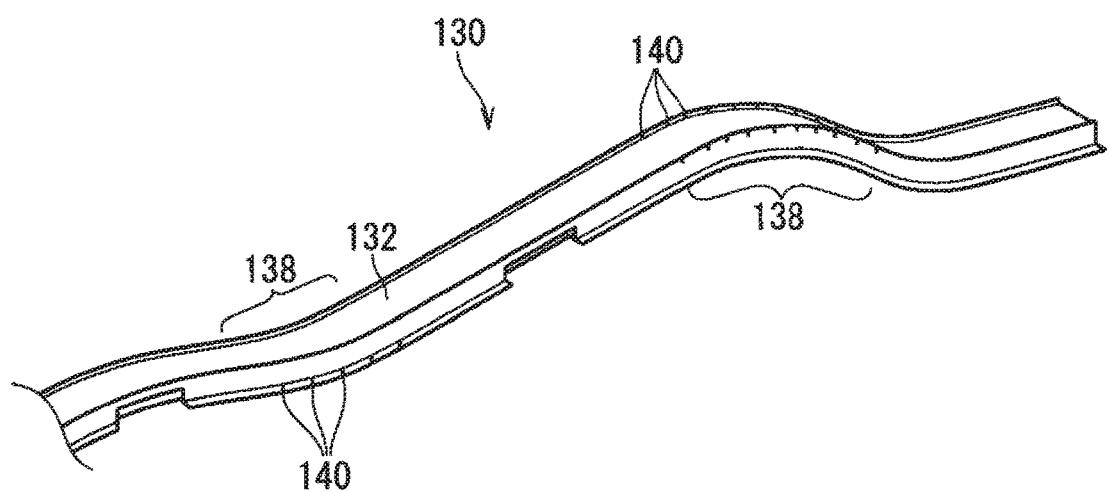
FIG. 6 is a perspective view showing an exterior member according to a first modification.
Figure 7:
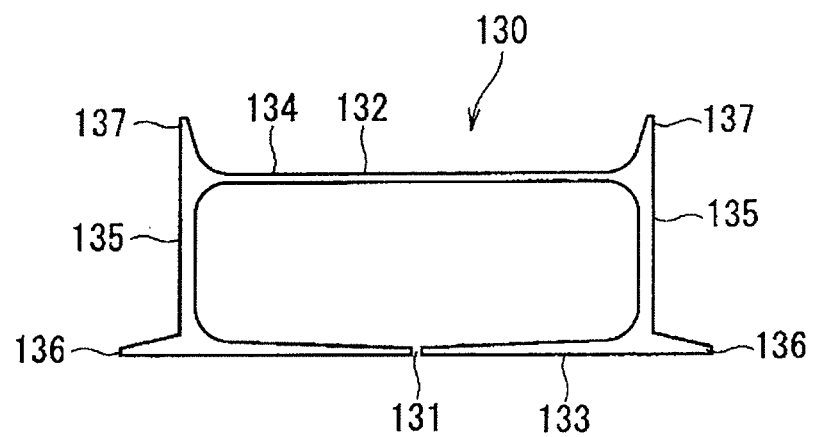
FIG. 7 is a cross-sectional view showing the exterior member.
Figure 8:
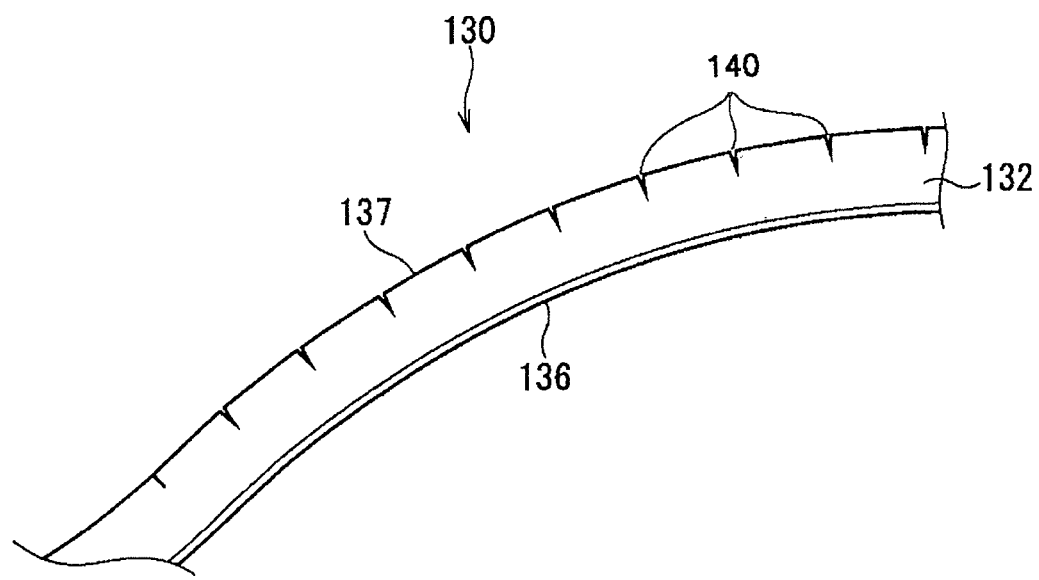
FIG. 8 is a diagram showing a state in which the exterior member is bent.

FIG. 6 is a perspective view showing an exterior member 130 according to a first modification, FIG. 7 is a cross-sectional view showing the exterior member 130, and FIG. 8 is a diagram showing a bent state of the exterior member 130.

The exterior member 130 is an elongate member formed by extrusion molding a softened resin. Here, extrusion molding is a processing method in which a softened resin is supplied to an extrusion molding mold, and then extruded as an elongate member having a predetermined cross-sectional shape. The elongate member is produced as a member having a predetermined cross-sectional shape corresponding to the shape of the outlet of the extrusion molding mold. Accordingly, by forming the outlet of the extrusion molding mold into a predetermined shape into which the exterior member 130 is to be processed, an elongate member having the same cross-sectional shape along the extension direction can be continuously formed easily.

Specifically, the exterior member 130 includes a body portion 132 having a quadrangular tubular shape. Here, the body portion 132 has a rectangular transverse cross-sectional shape (an example of a polygonal cross-sectional shape) in which a set of opposite sides (opposite sides along the transverse direction in FIG. 7) are longer than the other set of opposite sides (opposite sides along the longitudinal direction in FIG. 7). More specifically, the body portion 132 has the shape of a rectangular tube surrounded by a bottom plate portion 133, a top plate portion 134, and a pair of side plate portions 135 and 135. The following description will be given, assuming that a direction connecting the bottom plate portion 133 and the top plate portion 134 is the up-down direction, and a direction connecting the pair of side plate portions 135 and 135 is the width direction. However, the embodiments of the arrangement of the exterior member 130 in the vehicle are not limited to these directions.

A slit 131 for accommodating the wire harness 21 along the extension direction of the exterior member 130 is formed in the exterior member 130.

Reinforcing protrusions 136 and 137 extending along the extension direction of the body portion 132 of the exterior member 130 are formed on the body portion 132.

Here, a pair of reinforcing protrusions 136 each having an elongated plate shape are formed extending outward of the pair of side plate portions 135 from opposite lateral edges of the bottom plate portion 133. A pair of reinforcing protrusions 137 each having an elongated plate shape are formed extending outward (upward) of the top plate portion 134 from edges of the pair of side plate portions 135 on the top plate portion 134 side. Although the reinforcing protrusions 136 and 137 here are each formed in a shape whose thickness decreases toward the outer side thereof, this is not necessarily required. By varying the projecting direction between the reinforcing protrusion 136 and the reinforcing protrusion 137 in this manner, the exterior member 130 can be made difficult to bend in the width direction and the up-down direction thereof, thus making it possible to reliably maintain the straight state.

Note that the reinforcing protrusions 136 and 137 described above appear as projection shapes protruding laterally and upwardly in a transverse cross-sectional shape of the exterior member 130. The portion of the configuration that includes the body portion 132 and the reinforcing protrusions 136 and 137 is formed through extrusion molding of a resin.

Separation portions 140 for making a part of the exterior member 130 easily bendable in the extension direction thereof are formed in the exterior member 130. The separation portions 140 are portions formed by partly cutting outer circumferential portions of the exterior member 130 on both sides in the extension direction thereof, and can be formed by performing additional processing on the above-described elongate member that has been subjected to extrusion molding. The additional processing of the separation portions 140 can be performed, for example, with a pressing blade, a cutting blade, or by laser cutting. The separation portions 140 may be formed in portions of the outer circumference of the exterior member 130, and, therefore, may be formed only in the reinforcing protrusions 136 (or the reinforcing protrusions 137), or may be formed extending through portions of the outer circumference of the body portion 132.

Here, the exterior member 130 is gently bent at first portions 138 at two locations in an intermediate part of the extension direction thereof such that the first portions 138 are bent in directions opposite to each other, and is thus bent to form a gradual S-shaped curve in a plan view (see FIG. 6).

Accordingly, a plurality of separation portions 140 are formed at intervals in parts of the first portions 138 that are on the outer circumferential side (face radially outward) in a bent state. Thus, the part of the first portions 138 can be easily bent such that the reinforcing protrusions 136 or 137 on one side spread apart at the separation portions 140.

In the present embodiment, the separation portions are formed by straight cuts. However, the separation portions may also be formed in shapes by cutting the exterior member with gaps between the cuts in the extension direction thereof.

In parts of the exterior member 130 in which the separation portions 140 are not formed, the path of the wire harness 21 is restricted so as to keep the straight state as much as possible. Therefore, these parts are path restricting portions that restrict the path of the wire harness 21. Each of the first portions 138, in which the separation portions 140 are formed, of the exterior member 30 is an easily bendable portion that is more easily bendable than the path restricting portions.

For example, by attaching the first bent state-holding vehicle fixation component 40 and the second bent state-holding vehicle fixation component 50 to the exterior member 130 in the manner described in the above embodiment, and combining these components, the exterior member 30 can be held in a predetermined transporting configuration, thus making it possible to achieve the same operation and effects as those described in the above embodiment.

The first portions 138 may be preferably provided at portions that are bent in a state in which the first bent state-holding vehicle fixation component 40 and the second bent state-holding vehicle fixation component 50 are combined. The first portions 138 may be preferably provided at portions that are bent and disposed in a state in which a wire harness module including the present exterior member 130 is mounted to a vehicle. Portions of the exterior member 130 other than the above-described portions may be configured as path restricting portions that are not provided with the above-described separation portions.

With this configuration, a wire harness module including the present exterior member 130 can be more reliably maintained in a constant state in a transporting configuration and a configuration to be disposed in a vehicle.

As the exterior member including the path restricting portion that performs the path restriction for the wire harness and the easily bendable portion that is more easily bendable than the path restricting portion, it is possible to use, in addition to those described in the present modification, for example, a tube member in which a corrugated tubular shaped portion including thick annular portions and thin annular portions are provided successively in an alternating manner in the extension direction thereof, and a tubular shape portion including portions having the same shape (the same diameter portions) are provided successively are connected with each other.

At least one of the plurality of vehicle fixation components may be provided with an end holding portion that holds an end of the wire harness body 22.

Figure 9:
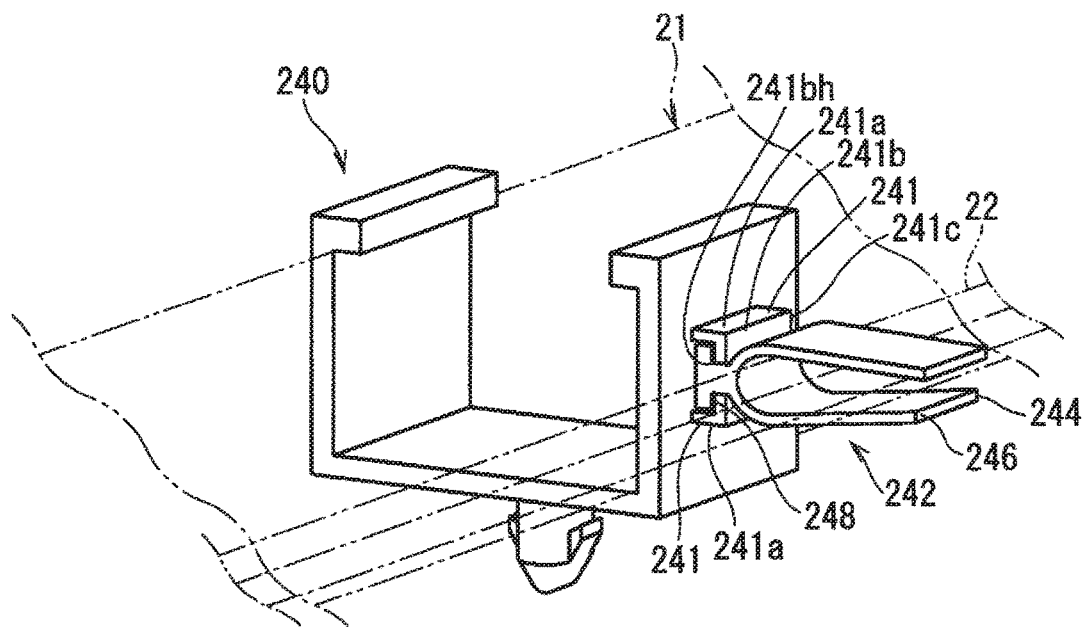
FIG. 9 is a diagram showing an example in which a first bent state-holding vehicle fixation component according to a second modification is provided with an end holding portion.
Figure 10:
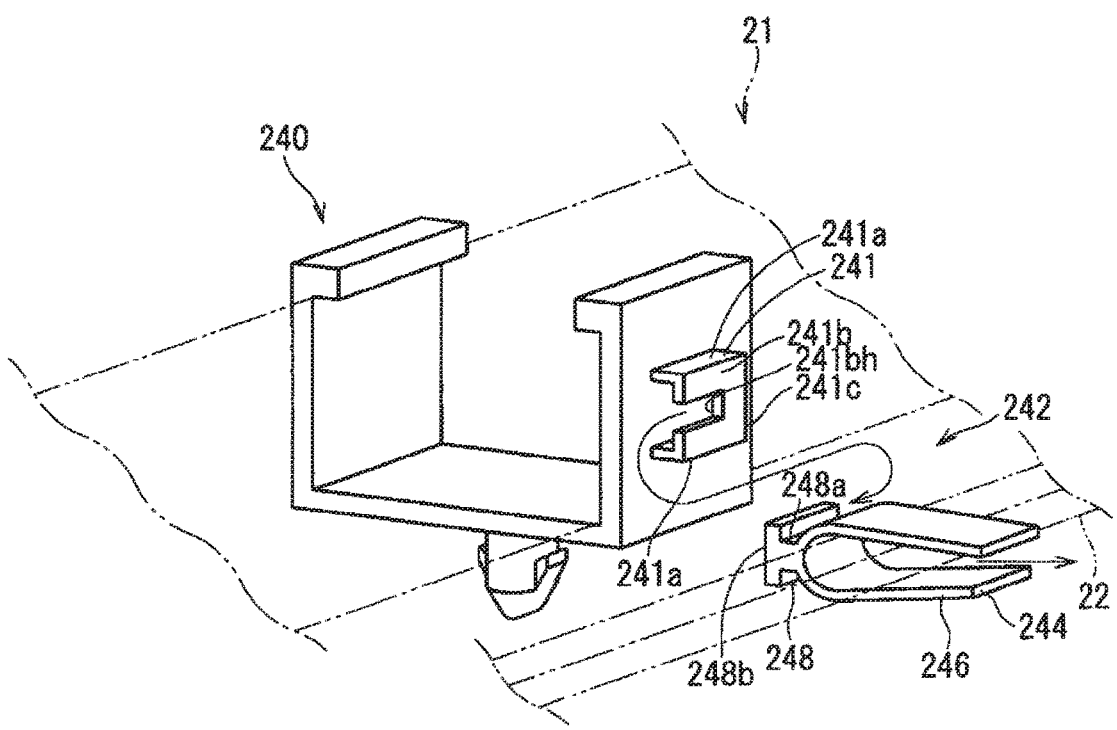
FIG. 10 is a diagram showing an example in which the first bent state-holding vehicle fixation component is provided with an end holding portion.

FIGS. 9 and 10 are diagrams showing an example in which a first bent state-holding vehicle fixation component 240 corresponding to the first bent state-holding vehicle fixation component 40 described above is provided with an end holding portion 242 that holds an end of the wire harness 21. The end holding portion 242 is separable from the first harness attachment portion 42 or the first vehicle fixation portion 44. FIG. 9 shows a state in which the end holding portion 242 is combined with the first harness attachment portion 42, and FIG. 10 shows a state in which the end holding portion 242 is separated from the first harness attachment portion 42.

That is, the end holding portion 242 includes an end holding portion combining portion 241 provided on the outer surface of one of the pair of side portions 42b of the first bent state-holding vehicle fixation component 240 that is located opposite to the side portion 42b on which the first combining portion 46 is provided, and an end holding component 244.

The end holding portion combining portion 241 includes a pair of side portions 241a, a ceiling portion 241b, and a stopper piece portion 241c. The pair of side portions 241a are formed in the shapes of elongated plates that are provided at an interval in a direction connecting the proximal end and the distal end of the side portion 42b. The ceiling portion 241b connects the distal ends of the pair of side portions 241a. An insertion recess 241bh extending from one end to the other end of the pair of side portions 241a in the extension direction is formed in the central part of the ceiling portion 241b in the width direction. The stopper piece portion 241c connects the other ends of the pair of side portions 241a with each other.

The end holding component 244 is a component that has been molded as one piece using a resin or the like, and includes a harness clamping portion 246 and a combining portion 248.

The harness clamping portion 246 is formed in a U-shape, and the width of the proximal end thereof is set to be larger than the width of an opening on the distal end. Then, when any of the ends of the wire harness 21 is disposed in the harness clamping portion 246, the end of the wire harness 21 is held in a state in which the end is clamped by the harness clamping portion 246. At this time, since the opening of the harness clamping portion 246 on the distal end is provided with a smaller width, the end of the wire harness 21 is prevented from falling off. When the end opening of the harness clamping portion 246 is elastically opened by moving the end of the wire harness 21 toward the opening of the harness clamping portion 246, the end of the wire harness 21 can be removed from the harness clamping portion 246.

The outward portion of the proximal end of the harness clamping portion 246 is provided with a combining portion 248. The combining portion 248 includes a base portion 248a and an insertion piece 248b. The base portion 248a is formed in an elongated shape. The thickness of the base portion 248a is set to be the same as or smaller (slightly smaller) than the width of the insertion recess 241bh, and is formed to be insertable into the insertion recess 241bh. The insertion piece 248b is formed as a rectangular piece formed protruding from the distal end of the base portion 248a to both sides thereof. The thickness of the insertion piece 248b is set to be the same as or smaller (slightly smaller) than the gap between the side portion 42b and the ceiling portion 241b, and the width of the insertion piece 248b is set to be the same as or smaller (slightly smaller) than the interval between the pair of side portions 241a.

Then, the base portion 248a of the combining portion 248 is inserted into the insertion recess 241bh, and the insertion piece 248b is inserted into the space surrounded by the pair of side portions 241a and the ceiling portion 241b, thus providing a state in which the end holding portion combining portion 241 and the combining portion 248 are combined. When a force is applied from this state to the end holding portion combining portion 241 in a direction in which the combining portion 248 is pulled out, their combined state can be released, thus making it possible to remove the combining portion 248 form the end holding portion combining portion 241.

Note that a protrusion and a recess that interlock with each other in the combined state of the end holding portion combining portion 241 and the combining portion 248 may be formed on the end holding portion combining portion 241 and the combining portion 248.

According to the present modification, an end of the wire harness 21 can be held on the first bent state-holding vehicle fixation component 240 that is at least one of the plurality of vehicle fixation components, and it is therefore possible to form the wire harness module in a more compact configuration.

The end holding component 244 is separable from the first harness attachment portion 42 and the first vehicle fixation portion 44. Accordingly, in a state in which the wire harness 21 is mounted to the vehicle, the end holding component 244 that has held the end of the wire harness 21 is absent, and the end holding component 244 will not become an obstruction, thus making it possible to inhibit interference with other portions in the vehicle.

Note that after the wire harness 21 has been mounted to the vehicle, the end holding component 244 may be collected for reuse, or may be discarded.

The above embodiment has been described using an example in which the first bent state-holding vehicle fixation component 240 is provided with the end holding portion 242. However, alternatively or additionally, the second bent state-holding vehicle fixation component 50 may be provided with the end holding portion.

In the above-described example, the end holding component 244 is combinable with the end holding portion combining portion 241. However, it is also possible to adopt a configuration in which the portion that holds an end of the wire harness is formed as one piece in a state in which it is coupled to the harness attachment portion or the vehicle fixation portion via a weakened portion such as a thin portion or a narrow portion, and will be separated by being broken at the weakened portion after the wire harness is mounted to the vehicle.

Second Embodiment

Figure 11:
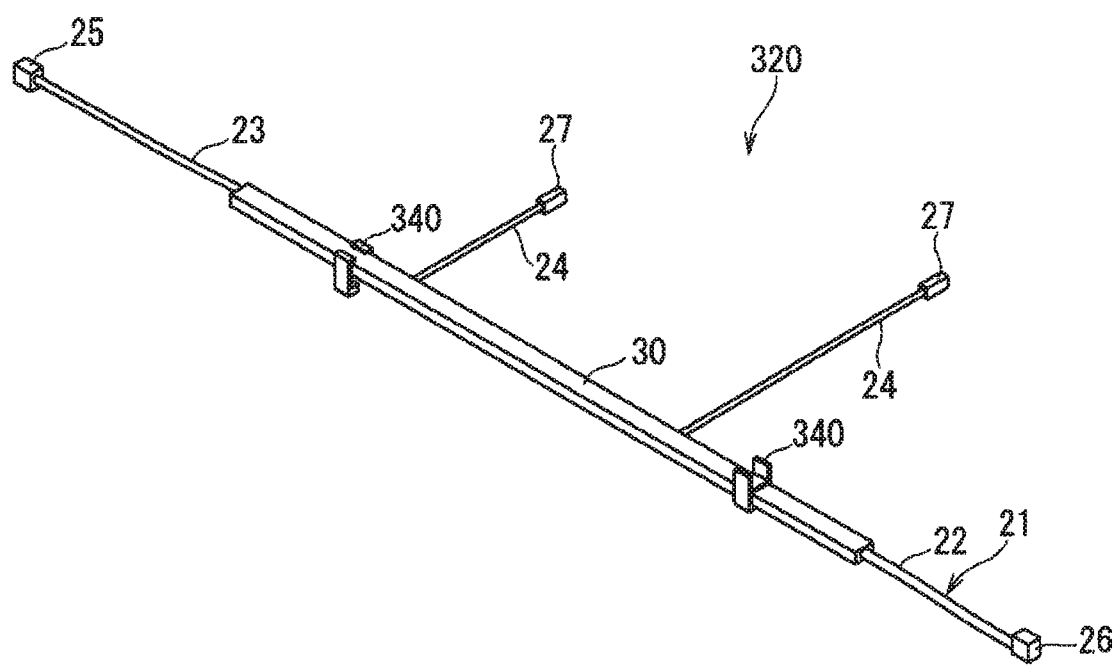
FIG. 11 is a schematic perspective view showing a configuration in which a wire harness module according to a second embodiment is straightened.
Figure 12:
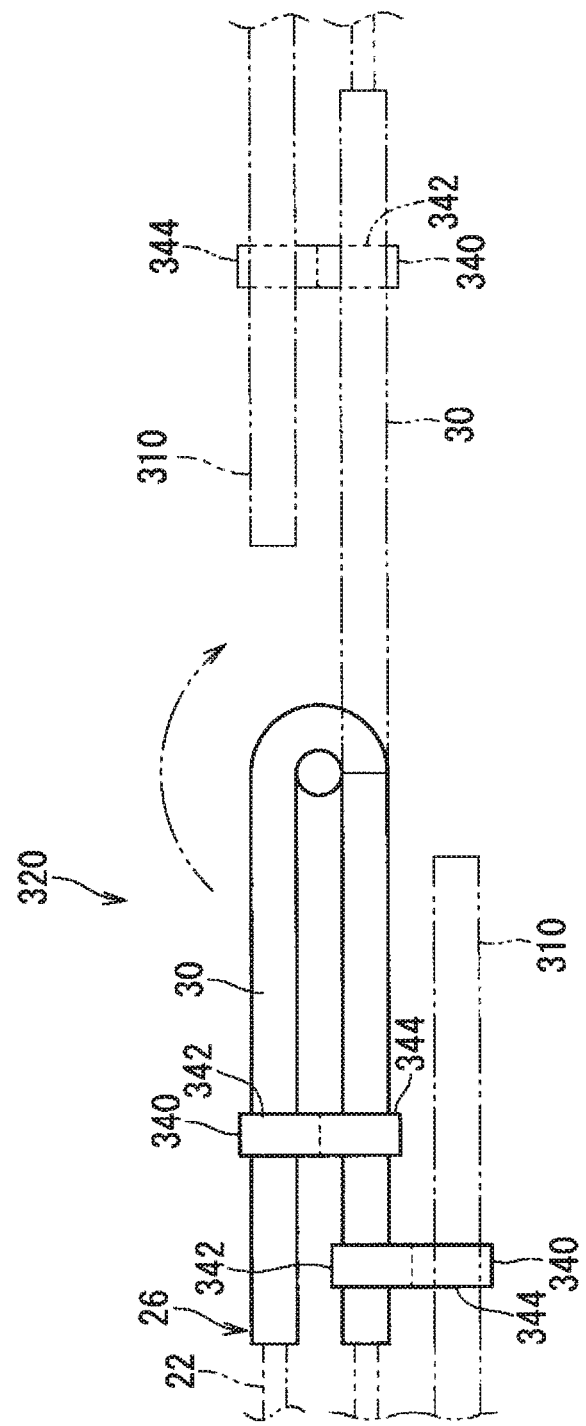
FIG. 12 is a schematic perspective view showing the wire harness module.

A wire harness module according to the second embodiment will be described. FIG. 11 is a schematic perspective view showing a configuration in which a wire harness module 320 is straightened, and FIG. 12 is a schematic perspective view showing the wire harness module 320. In FIG. 12, the wire harness module 320 in the initial state in which the wire harness module 320 is subjected to the operation of being disposed in a vehicle from a state in which it is folded in a transporting configuration is indicated by solid lines, and the wire harness module 320 that has been straightened from this state is indicated by dashed doubledotted lines. In the following description, the same constituent elements as those described in the first embodiment may be denoted by the same reference numerals, and their description may be omitted.

The wire harness module 320 includes a wire harness 21, and a plurality of vehicle fixation components 340 serving as a plurality of vehicle fixation components.

The wire harness 21 has the same configuration as that described in the first embodiment, and is configured such that an exterior member 30 is externally mounted to a wire harness body 22.

Figure 13:
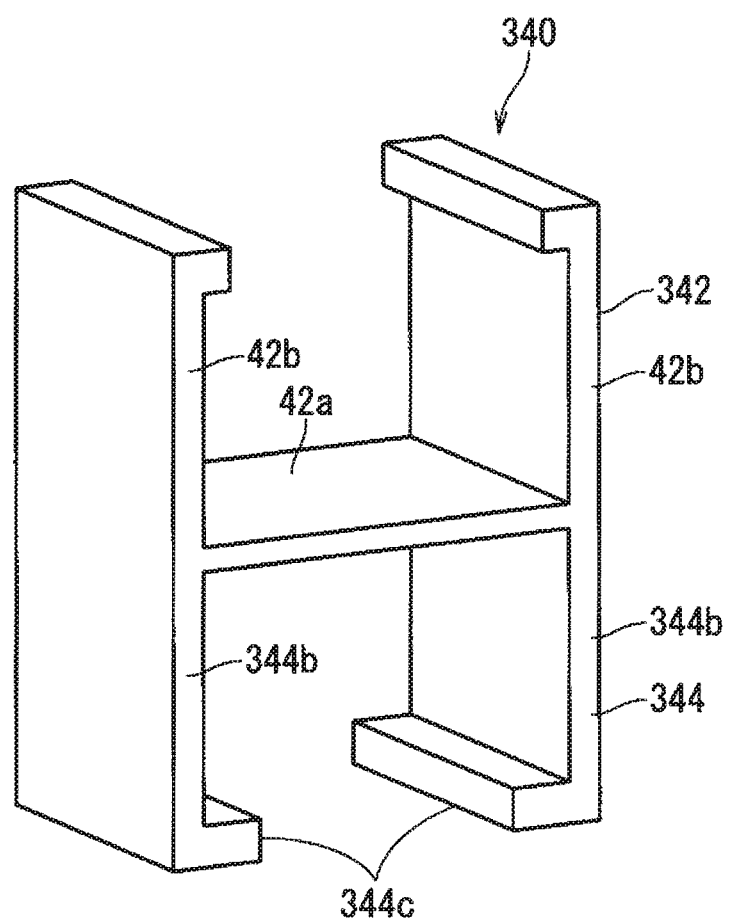
FIG. 13 is a schematic perspective view showing a vehicle fixation component according to the second embodiment.

A plurality of vehicle fixation components 340 are attached to the wire harness 21. FIG. 13 is a schematic perspective view showing a vehicle fixation component 340.

Here, a mounting target portion 310 is an elongated frame-shaped component, more specifically, a quadrangular tubular component having the same width and height as those of the exterior member 30.

Each vehicle fixation component 340 is a component that has been molded as one piece using a resin or the like, and includes a harness attachment portion 342 and a vehicle fixation portion 344.

The harness attachment portion 342 is a portion having the same configuration as that of the first harness attachment portion 42.

The vehicle fixation portion 344 is attachable to the mounting target portion 310 of a vehicle. Here, the vehicle fixation portion 344 includes a base portion and a pair of side portions 344b, as in the case of the first harness attachment portion 42.

The base portion 42a of the harness attachment portion 342 is also used as the base portion of the vehicle fixation portion 344. The pair of side portions 344b are formed in shapes standing upright from opposite sides of the base portion 42a to the other principal surface side of the base portion 42a (i.e., the side opposite to the pair of side portions 42b of the harness attachment portion 342).

The pair of side portions 344b are provided with a length sufficient to extend above the outer surfaces of the exterior member 30 and the mounting target portion 310 on the narrower side. At a distal end of each of the pair of side portions 344b, a locking piece 344c protruding inward therefrom is formed. A space in which the exterior member 30 or the mounting target portion 310 can be disposed is formed between the base portion 42a and the pair of side portions 344b.

Then, the inward-facing surface of the base portion 42a is brought into contact with one outer surface of the exterior member 30 or the mounting target portion 310 on the wider side, and the inward-facing surfaces of the pair of side portions 344b are brought into contact with a pair of outer surfaces of the exterior member 30 or the mounting target portion 310 on the narrower side, thus causing the locking pieces 42c to abut against the other outer surface of the exterior member 30 or the mounting target portion 310 on the wider side. Consequently, the vehicle fixation portion 344 can be selectively attached to the exterior member 30 and the mounting target portion 310.

The plurality of (here, two) vehicle fixation components 340 are provided to the wire harness 21 (here, the exterior member 30) at separate positions in the extension direction, as in the case of the first embodiment described above.

In the bent state of the wire harness module 320, one vehicle fixation component 340 of the plurality of (here, two) vehicle fixation component 340 is used as a dual-purpose vehicle fixing component. That is, the vehicle fixation portion 344 of the one dual-purpose vehicle fixation component 340, which serves as the harness holding dual-purpose vehicle fixation portion, holds another portion (here, a portion that is another portion of the exterior member 30 and is located at a position near the other vehicle fixation component 340) of the wire harness 21, thus maintaining the wire harness 21 in a bent form (see FIG. 12).

Note that the vehicle fixation portion 344 of the other vehicle fixation component 340 is exposed to the outside, and stays fixable to the vehicle.

Then, after the vehicle fixation portion 344 of the other vehicle fixation component 340 is attached to a mounting target portion 310, the holding of the wire harness 21 by the vehicle fixation portion (harness holding dual-purpose vehicle fixation portion) 344 of the one vehicle fixation component (dual-purpose vehicle fixation component) 340 is released, and the vehicle fixation portion (harness holding dual-purpose vehicle fixation portion) 344 of the one vehicle fixation component (dual-purpose vehicle fixation component) 340 is fixed to the mounting target portion 310. Here, the mounting target portion 310 to which the vehicle fixation portion 344 of the other vehicle fixation component 340 is fixed, and the mounting target portion 310 to which the vehicle fixation portion (harness holding dual-purpose vehicle fixation portion) 344 of the one vehicle fixation component (dual-purpose vehicle fixation component) 340 is fixed are described as being components that are disposed at different positions in the up-down direction. However, if it is possible to twist the wire harness, for example, the mounting target portions 310 to which the two vehicle fixation components 340 are fixed may also be present on the same side relative to the wire harness 21.

According to the second embodiment, while the wire harness 21 is maintained in a bent form by the vehicle fixation portion (harness holding dual-purpose vehicle fixation portion) 344 of one vehicle fixation component (dual-purpose vehicle fixation component) 340, the vehicle fixation portion 344 of the other vehicle fixation component 340 can be fixed to a mounting target portion 310. Thereafter, the vehicle fixation portion (harness holding dual-purpose vehicle fixation portion) 344 of the one vehicle fixation component (dual-purpose vehicle fixation component) 340 can be removed from the wire harness 21 to straighten the wire harness 21, and the vehicle fixation portion (harness holding dual-purpose vehicle fixation portion) 344 of the one vehicle fixation component (dual-purpose vehicle fixation component) 340 can be fixed to a mounting target portion 310.

Accordingly, the operation of mounting the wire harness 21 to the vehicle can be easily performed, as in the case of the first embodiment described above.

Furthermore, the vehicle fixation portion (harness holding dual-purpose vehicle fixation portion) 344 can also be used as a configuration that holds the wire harness 21 in a bent state and a configuration for fixing the wire harness 21 to a vehicle, thus making it possible to achieve a simplified configuration.

Modifications

Note that the vehicle fixation portion 344 of the vehicle fixation component 340 shown in the second embodiment may also be provided with the first combining portion 46 or the second combining portion 56 described above.

The configurations described in the embodiments and the modifications may be combined as appropriate as long as there are no mutual inconsistencies. For example, the vehicle fixation component 340 described in the second embodiment may also be provided with the end holding portion 242.

Although the present invention has been described above in detail, the foregoing description is in all aspects illustrative and the invention is not limited thereto. It will be appreciated that numerous modifications not illustrated herein can be made without departing from the scope of the present invention.

LIST OF REFERENCE NUMERALS

10 Mounting target portion
20 Wire harness module
21 Wire harness
22 Wire harness body
40 First bent state-holding vehicle fixation component
42 First harness attachment portion
44 First vehicle fixation portion
46 First combining portion
50 Second bent state-holding vehicle fixation component
52 Second harness attachment portion
54 Second vehicle fixation portion
56 Second combining portion
240 First bent state-holding vehicle fixation component
241 End holding portion combining portion
242 End holding portion
244 End holding component
246 Harness clamping portion
248 Combining portion
310 Mounting target portion
320 Wire harness module
340 Vehicle fixation component
342 Harness attachment portion
344 Vehicle fixation portion

The invention claimed is:

1. A wire harness module comprising:
a wire harness including a plurality of wires; and
a plurality of vehicle fixation components that are attached to the wire harness and are attachable to a vehicle,
wherein, in a state in which at least one of the plurality of vehicle fixation components is fixed to the vehicle, at least one of the plurality of vehicle fixation components keeps the wire harness in a bent form,
the plurality of vehicle fixation components include a first vehicle fixation component and a second vehicle fixation component that are attached to the wire harness at separate positions,
the first vehicle fixation component includes a first harness attachment portion that is attached to the wire harness, a first vehicle fixation portion that is fixable to the vehicle, and a first combining portion,
the second vehicle fixation component that has a different shape from the first vehicle fixation component, and includes a second harness attachment portion that is attached to the wire harness, a second vehicle fixation portion that is fixable to the vehicle, and a second combining portion that has a different shape from the first combining portion of the first vehicle fixation component, and
the second combining portion of the second vehicle fixation component is configured to be removably combined with the first combining portion of the first vehicle fixation component, with the wire harness bent between the first vehicle fixation component and the second vehicle fixation component.

2. A wire harness module comprising:
a wire harness including a plurality of wires; and
a plurality of vehicle fixation components that are attached to the wire harness and are attachable to a vehicle,
wherein, in a state in which at least one of the plurality of vehicle fixation components is fixed to the vehicle, at least one of the plurality of vehicle fixation components keeps the wire harness in a bent form,
the at least one of the plurality of vehicle fixation components that keeps the wire harness in a bent form includes a dual-purpose vehicle fixation component including a harness attachment portion that is attached to the wire harness, and a dual-purpose vehicle fixation portion that is fixable to the vehicle and is configured to keep the wire harness in a bent form,
the harness attachment portion includes a base portion, first side portions and first locking pieces, the first side portions standing upright from a first surface of the base portion at opposite ends of the base portion, the first locking pieces extending inward from a distal end of each of the first side portions, and
the dual-purpose vehicle fixation portion includes the base portion, second side portions and second locking pieces, the second side portions standing upright from a second surface of the base portion at the opposite ends of the base portion, and the second locking pieces extending inward from a distal end of each of the second side portions, the second surface being a rear surface of the first surface.

3. The wire harness module according to claim 1,
wherein at least one of the plurality of vehicle fixation components is provided with an end holding portion configured to hold an end of the wire harness.

4. The wire harness module according to claim 3,
wherein the end holding portion includes an end holding component that is separable from a portion attached to the wire harness or a portion attachable to the vehicle, of the at least one of the plurality of vehicle fixation components.

5. A wire harness module comprising:
a wire harness including a plurality of wires; and
a plurality of vehicle fixation components that are attached to the wire harness and are attachable to a vehicle,
wherein, in a state in which at least one of the plurality of vehicle fixation components is fixed to the vehicle, at least one of the plurality of vehicle fixation components keeps the wire harness in a bent form,
the plurality of vehicle fixation components include a first dual-purpose vehicle fixation component and a second dual-purpose vehicle fixation component having a same shape,
each of the first dual-purpose vehicle fixation component and the second dual-purpose vehicle fixation component includes a harness attachment portion that is attached to the wire harness, and a dual-purpose vehicle fixation portion that is fixable to the vehicle and is configured to hold the wire harness,
the harness attachment portion of the first dual-purpose vehicle fixation component is attached to a first position of the wire harness, and the dual-purpose vehicle fixation potion of the first dual-purpose vehicle fixation component holds a second position of the wire harness with the wire harness bent between the first position and the second position, and
the harness attachment portion of the second dual-purpose vehicle fixation component is attached to a third position of the wire harness, and the dual-purpose vehicle fixation potion of the second dual-purpose vehicle fixation component is fixed to the vehicle.

6. The wire harness module according to claim 1, wherein the first combining portion is provided on an outer surface of the first harness attachment portion, and includes side portions, a ceiling portion and a stopper piece portion, the side portions are elongated plates that extend from the outer surface of the first harness attachment portion and are spaced from each other, the ceiling portion connects distal ends of the side portions, such that a gap is provided between the outer surface of the first harness attachment portion and the ceiling portion, an insertion recess is provided in the ceiling portion and extends from a first end to a second end of the side portions in an elongated direction of the elongated plates, and the stopper piece portion connects the second ends of the side portions with each other, wherein the second combining portion is provided on an outer surface of the second harness attachment portion, and includes a base portion and an insertion piece, the base portion is an elongated portion and attached on the outer surface of the second harness attachment portion, the thickness of the base portion is equal to or smaller than a width of the insertion recess of the first combining portion in a direction perpendicular to the elongated direction, and is configured to be inserted into the insertion recess, the insertion piece is a rectangular piece protruding from a distal end of the base portion to opposite sides of the base portion in a direction perpendicular to an elongated direction of the elongated portion, a thickness of the insertion piece is equal to or smaller than the gap between the outer surface of the first harness attachment portion and the ceiling portion, and a width of the insertion piece is equal to or smaller than an interval between the side portions.

7. The wire harness module according to claim 6, wherein the first combining portion further includes a retaining protrusion that is located on the outer surface of the first harness attachment portion and between the side portions, and a protruding dimension of the retaining protrusion gradually increases from the first end toward the second end of the side portions in the elongated direction.

8. The wire harness module according to claim 6, wherein the first harness attachment portion includes a first base portion, first side portions and first locking pieces, the first side portions standing upright from a surface of the first base portion at opposite ends of the first base portion, the first locking pieces extending inward from a distal end of each of the first side portions,
the first combining portion is provided on an outer surface of one of first side portions,
the second harness attachment portion includes a second base portion, second side portions and second locking pieces, the second side portions standing upright from a surface of the second base portion at opposite ends of the second base portion, the second locking pieces extending inward from a distal end of each of the second side portions, and
the second combining portion is provided on an outer surface of one of second side portions.

9. The wire harness module according to claim 3, wherein
the end holding portion includes an end holding component including a harness clamping portion, and
the harness clamping portion has a U-shape, and a width of a proximal end of the harness clamping portion is larger than a width of an opening on a distal end of the harness clamping portion, such that the end of the wire harness disposed in the harness clamping portion is clamped by the harness clamping portion.

10. The wire harness module according to claim 4, wherein
the end holding portion further includes an end-holding-portion combining portion provided on an outer surface of a harness attachment portion of the at least one of the plurality of vehicle fixation components provided with the end holding portion,
the end holding component includes a harness clamping portion and a combining portion,
the harness clamping portion has a U-shape, and a width of a proximal end of the harness clamping portion is larger than a width of an opening on a distal end of the harness clamping portion, such that the end of the wire harness disposed in the harness clamping portion is clamped by the harness clamping portion, and
the combining portion is provided on an outer surface of the harness clamping portion at the proximal end of the harness clamping portion, and is combined with the end-holding-portion combining portion.

11. The wire harness module according to claim 10, wherein
the end-holding-portion combining portion includes side portions, a ceiling portion, and a stopper piece portion,
the side portions are elongated plates that extend from the outer surface of the harness attachment portion and are spaced from each other, the ceiling portion connects distal ends of the side portions, such that a gap is provided between the outer surface of the harness attachment portion and the ceiling portion, an insertion recess is provided in the ceiling portion and extends from a first end to a second end of the side portions in an elongated direction of the elongated plates, and the stopper piece portion connects the second ends of the side portions with each other, wherein the combining portion of the end holding component includes a base portion and an insertion piece, the base portion is an elongated portion and attached on the outer surface of the harness cramping portion, the thickness of the base portion is equal to or smaller than a width of the insertion recess of the end-holding-portion combining portion in a direction perpendicular to the elongated direction, and is configured to be inserted into the insertion recess, the insertion piece is a rectangular piece protruding from a distal end of the base portion to opposite sides of the base portion in a direction perpendicular to an elongated direction of the elongated portion, a thickness of the insertion piece is equal to or smaller than the gap between the outer surface of the harness attachment portion and the ceiling portion, and a width of the insertion piece is equal to or smaller than an interval between the side portions.

* * * * *